: 3,329,574
Patented July 4, 1967

3,329,574
METHOD AND MATERIAL FOR SELECTIVE DIFFUSION
Lawrence E. Barron, Teaneck, N.J., and Andrew G. Tsuk, Yonkers, N.Y., assignors to Schwarz Bioresearch Inc., Orangeburg, N.Y., a corporation of New York
No Drawing. Continuation of application Ser. No. 171,293, Feb. 5, 1962. This application Apr. 12, 1965, Ser. No. 447,527
6 Claims. (Cl. 167—82)

The present application is a continuation of application Ser. No. 171,293 filed Feb. 5, 1962, now abandoned.

This invention relates to a novel method and material for the selective diffusion.

The invention is based on the discovery that gelatin cross linked by disulfide bonds, while being substantially water-insoluble, even up to the boiling temperature, allows the selective diffusion of water and certain water-soluble materials through its molecular structure and that the degree of permeability may be controlled by the number of cross-linking disulfide bonds.

In accordance with the invention a water-soluble material is released into an aqueous medium at a controlled rate or an aqueous medium is selectively diffused in contact with a material by maintaining a layer of the gelatin cross linked by disulfide bonds between the material and the aqueous media.

The material released into the aqueous media or diluted by the aqueous media may be coated with the gelatin cross linked by the disulfide bonds, herein referred to as cross-linked thiolated gelatin, by imbedding the material in a body of the cross-linked thiolated gelatin, encapsulating the material in the cross-linked thiolated gelatin or maintaining the material behind a diffusion membrane of the cross-linked thiolated gelatin.

The cross-linked thiolated gelatin may be formed by introducing thiol groups into gelatin and preferably high bloom gelatin having a molecular weight above about 100,000. Preferably about 2–25 thiol groups per mol are introduced.

The thiol groups are then allowed to cross link in the form of disulfide bonds by allowing the thiolated gelatin to stand in an oxidizing element, such as air, over a period of time though the cross linking may be accelerated by the addition of an oxidizing agent, as for example hydrogen peroxide, ammonium persulfate, potassium ferricyanide, ammonium perborate or the like. The cross-linking will generally occur in an alkaline pH range, preferably between 8 and 10, and usually within this pH range the amount of oxygen normally occluded in the gelatin is sufficient to effect the cross-linking.

The thiolation of the gelatin per se may be effected by dissolving the gelatin in water, adding a sufficient amount of a tertiary amine, as for example trimethyl amine, diethyl amine or diethylethanol amine to adjust the pH to a value between about 9.5–11.5, and preferably between about 10.5–11, adding a thiolactone, such as N-acetyl homocysteine thiolactone and stirring until the thiolation is complete which may, for example take as little time as between 1 and 3 minutes or may require reaction times up to an hour depending on the temperature used, which may, for example, range between 0–50° C. The completion of the reaction is indicated by a stabliziation of the pH without further addition of the tertiary amine. The solution is then preferably acidified with a dilute mineral acid and precipitated, as for example for acetone and recovered in dry form. The powder may then be dissolved in water in the same manner as conventional gelatin and the pH adjusted to a value above 9, as for example with the use of a suitable alkali such as sodium hydroxide to allow the cross linking. In this form the thiolated gelatin may be cast or molded in a suitable form for release or diffusion in accordance with the invention and allowed to set and cross-link or the cross linking accelerated by the use of an oxidizing agent.

The invention is particularly applicable for use in the numerous instances where it is desired to release a water-soluble substance slowly into an environment or where it is desirable to allow an aqueous media to selectively diffuse in contact with the material while maintaining the material enrobed or physically restrained.

The invention is thus applicable for the sustained release of medicaments by diffusion, in the control of microorganisms in bodies of water by release of algicides and bactericides, the slow diffusion of animal and fish repellents or attactants in bodies of water, and in the controlled release of hormones, fertilizers, insecticides into a media in which living organisms may be present and in a variety of topical or internal applications where it is desired to diffuse an agent over an extended period of time. Thus, for example, water-soluble pharmaceuticals or therapeutic agents may be coated, enrobed, or encapsulated in the cross-linked thiolated gelatin for slow release by diffusion. This is to be differentiated from the case where the medicament or pharmaceutical material is released by dissolving or other destruction of a coating. The invention is also applicable to topical films, bandages, or dressings containing medicaments, antibiotics, or healing-promoting agents; thus for example a film or coating of the thiolated gelatin containing the therapeutic agent, as for example an antibiotic and a healing-promoting agent, such as nucleic acid may be used to coat the skin and wound and allowed to cross-link as for example, by the addition of hydrogen peroxide causing the film to adhere firmly to the skin. By the controlled diffusion, the therapeutic agents will slowly and at a controlled, prolonged rate diffuse into the wound and the surrounding area.

Similarly, bandages, compresses, or other dressings may be impregnated with or coated with the cross-linked thiolated gelatin containing the therapeutic agent. When secured or pressed in contact with the wound, the controlled diffusion will allow the release of the therapeutic agent into the wound and surrounding area at a controlled, prolonged rate. Furthermore, the cross-linked thiolated gelatin will not adhere to the wound and is completely compatible and non-toxic.

In the same manner, the invention is applicable in connection with implants and hemostatic agents by forming such implants or hemostatic agents with the cross-linked thiolated gelatin containing desirable materials as for examples hormones, allergens, or antibiotics, which will slowly diffuse into the surrounding tissue at the desired controlled rate. For this purpose, it may be desirable to form the thiolated gelatin body in a foam-like or sponge-like form, as for example by violently aerating the thiolated gelatin solution as the same is cast into a film or molded.

Prosthetic materials to simulate tissue following surgical modifications may be formed in accordance with the invention by forming cross-linked thiolated masses which simulate the tissue density and which may contain materials, as for example antibiotics to prevent infection for release by the diffusion.

For controlled diffusion membranes, films of the cross linked thiolated gelatin may be cast per se or screens, gauzes, tissues or other permeable members may be coated with the cross-linked thiolated gelatin. This material may be used as diaphragms in electrolytic processes or may, for example, be used to coat surfaces wherein it is desirable to allow ionic transfer but otherwise to protect the surface. Thus, for example, films of the cross-linked thiolated gelatin per se, or in the form of coatings on permeable members, may be used to coat and protect the members involved in ionic processes, as for example surfaces in electrolytic cells, as for example, zinc surfaces in a dry cell.

To produce artificial baits, various degraded meat and fish residues, and if desirable chemical attractants, such as dimethyl amine and vanillin, may be cast into a body, as for example a cubular structure of the thiolated gelatin which is then allowed to cross link. This may then be used in fish or crustacean traps, or as chum. In a similar manner, repellents, as for example shark repellent may be incorporated in this cross-linked thiolated gelatin body for sustained, prolonged release. Similarly, insecticides, algicides, mulloskosides, or the like, may be incorporated in the cross linked thiolsted gelatin bodies for the sustained controlled release. The gamma isomer of benzene hexachloride, for example, may be incorporated in cubes of the cross-linked thiolated gelatin for depositing in streams for the control of black flies.

The cross-linked thiolated gelatin may also be used as a protective food barrier, which allows diffusion of water into the material, as for example, during cooking, but which selectively prevents the escape of desirable materials, as for example, vitamins, such as Vitamin $B_{12}$.

Films, or reinforced films of the cross-linked thiolated gelatin may be used as a packaging material for foods which will allow, during cooking, a selective permeability of the water into the food without escape of the food or food substances into the cooking water. For example, dehydrated foods may be packaged in packages of the cross-linked thiolated gelatin and directly immersed in boiling water for cooking, which allows diffusion of the cooking water through the package, hydrating the food and yet preventing the escape of this food. These packages may, for example, be pre-shaped to the ultimate desired form of the cooked food.

The cross-linked, thiolated gelatin is unique in its characteristics of combining its controlled, selective permeability to the aqueous media up to the boiling temperature, with the complete compatibility of the material to living organisms, such as humans and animals, the eatability and digestibility of the material, and the characteristic of the material of complete digestion by proteolytic enzymes.

The invention will be described in further detail with reference to the following examples, which are given by way of illustration and not limitation:

EXAMPLE 1

100 parts of a 5% (250 Bloom) gelatin was mixed with 2.5 parts by volume of triethylamine at 27° C. forming a solution having a PH between the range of 10.5–11. 150 mgs. of N-acetyl homocysteine thiolactone was added and the solution was stirred over a period of 1½ hours during which time amounts of triethylamine were added to maintain the solution within the pH range indicated above. The solution was then acidified with a 5N hydrochloric acid to bring the pH to a value between 3.0–3.5. The solution was then transferred into 400 ml. of acetone and cooled to a temperature of −30° C. The precipitated thiolated gelatin was recovered and washed, and then dissolved in warm water to form a clear solution of about 10% concentration. The pH of the solution was adjusted to a value of about 8.5 by the addition of sodium hydroxide and about 1.5% by weight of degraded meat and fish residues or 0.3% by weight of dimethylamine and 0.3% trimethylamine were added to the solution and the solution stirrred. The solution of this material was then poured into pans to a depth of about ¾ of an inch and allowed to gel and cross link in the refrigerator. After about a week, the material is cut into the form of cubes of about 1″ square and about ¾″ thickness which are utilized in traps for crustaceans, such as lobsters and crabs.

EXAMPLE 2

Thiolated gelatin is prepared as described in Example 1. The entire incorporation and cross-linking procedure was followed as described in Example 1 except that the material incorporated consisted of 1.5% by weight of quinine hydrochloride. Pieces of this cross-linked gel, from which the quinine slowly diffuses, are utilized in submerged traps and cages for the purpose of repelling undesirable fish and microscopic life routinely encountered in reservoirs and other bodies of water.

EXAMPLE 3

A 10% solution of thiolated gelatin was prepared as described in Example 1, adjusted to pH 8.5, and used to cast films in the form of small capsules. Following overnight air oxidation in a refrigerator, the capsules became cross-linked in the disulfide form. The capsules then were filled with medicaments consisting of tetracycline (an antibiotic) and niacin (a vitamin). When the filled capsules were immersed in water, the capsule walls remained insoluble, even at high temperatures, but the contents could diffuse slowly through the capsule wall into the aqueous environment.

In order to retard the diffusion rate, the above example was repeated using a twofold increase of sulfhydryl groups in the thiolated gelatin. This was accomplished by raising the concentration of thiolactone reagent in the preparatory method to 0.06% of the dissolved gelatin. The resulting increased concentration of sulfhydryl groups caused a slower diffusion of the capsule contents into the aqueous environment.

EXAMPLE 4

Example 3 was repeated with the exception that pure ethanol was substituted for the medicament in the capsule contents. The ethanol-containing capsules, each 300 mg., comprised 4% of an animal feed supplement. The balance of the supplement consisted of urea as a nitrogen source, phosphoric acid as a phosphorous source, vitamins and trace minerals like potassium iodide. The ethanol can diffuse out slowly through the capsule wall as noted in the previous example. In this way, animal feeds containing soluble components like ethanol can be converted to an easily handled form in which all the constituents of the feed are made available in the dry form.

EXAMPLE 5

One gram of the vitamin niacin was dissolved in 100 ml. of a 10% gelatin solution and dried to a brittle film in a vacuum chamber. The film was ground to a powder and then subjected to the thiolation process by suspending the powder in cold water at a 10% concentration followed by pH adjustment of the mixture to 9.5–10.5 with triethylamine. N acetyl homocysteine thiolactone was then added to the mixture at a concentration of 0.08% and the reaction mixture stirred for 30 minutes. The pH then was adjusted to 5.0 with commercially available hydrochloric acid diluted 1 to 1 with tap water. The particles in suspension were then recovered by filtration. It was found that upon suspension in fresh distilled water, the enrobed niacin diffused slowly through the cross-linked thiolated gelatin matrix into the surrounding aqueous environment. This could be done even at boiling temperatures without destroying the semi-permeable thiolated gelatin film.

EXAMPLE 6

200 ml. of a 10% solution of thiolated gelatin was prepared as described in Example 1. Two grams of the antibacterial hexachlorophene were dissolved in the solution of thiolated gelatin to give a final concentration of 1%. The solution pH was adjusted to 7.0 and poured into a ½″ thick layer. This was allowed to cross-link in the refrigerator for one week after which small pieces 2″ x 1″ by ½″ were cut and suspended in water containing a high level bacterial population. The cross-linked matrix did not dissolve even at hot water temperatures but permitted diffusion of the contained antibacterial into the aqueous environment thereby reducing the bacterial population as shown by conventional bacterial plate count technique.

EXAMPLE 7

A 10% solution of thiolated gelatin was prepared as described in Example 1 and pH adjusted to 8.5. The thiolated gelatin solution is applied to a moving bed of ammonium chloride tablets in the coating pan by pouring the mixture uniformly over the tablet surfaces. As the tablets rotate, heated air evaporates the moisture leaving a thin cross-linked film of thiolated gelatin on the tablet surface. After approximately 20 minutes drying time, additional coats of thiolated gelatin are applied. When these coated tablets are immersed in hot water, the coating remains intact but the ammonium chloride can diffuse slowly through the applied film and into the aqueous environment.

EXAMPLE 8

The thiolated gelatin coating method was carried out as described in Example 7 with the exception that granules of a commercially available fertilizer—urea formaldehyde—were substituted for the ammonium chloride tablets. When these coated granules were placed in an aqueous environment, the cross-linked thiolated gelatin membrane permitted slow diffusion of the fertilizer into the surrounding medium. The diffusion membrane remained intact even when the temperature of the surrounding aqueous medium was raised above the melting point of normal, untreated gelatin.

EXAMPLE 9

800,000 units of crystalline (Worthington) deoxyribonuclease (DNAse), a depolymerizing enzyme, are added to 50 mg. of deoxyribonucleic acid (DNA). After the DNA is reduced to a low molecular weight solution, the material is mixed with a 10% solution of pH 8.0 thiolated gelatin as described in Example 1 above. This mixture is sprayed onto abraded skin and allowed to air oxidize to a thin cross-linked film. The incorporated depolymerized DNA then diffuses out of the thiolated gelatin film onto the skin and into the wound to facilitate the healing processes. This film adheres to the skin in spite of washing with water at room temperature and higher temperatures.

EXAMPLE 10

A 1% aqueous solution of phenethyl alcohol, an aromatic organic compound, and a 1.0% solution of F.D.C. Blue No. 1, a dye, are mixed into a 10% solution of thiolated gelatin prepared as in Example 1. The final concentration of each material is 0.1% in the thiolated gelatin. The pH is adjusted to 8.0 with sodium hydroxide and painted into the skin as for example as an eye shadow so that it may gel and cross-link upon exposure to air. In this manner, a thin film coating is deposited on the skin which permits the volatile aromatic compound to diffuse out slowly.

EXAMPLE 11

Thiolated gelatin solution as described in Example 1 is prepared and the pH adjusted to 7.5. A solution of pharmaceutical grade penicillin is dissolved in the gelatin to give a total concentration of 500,000 units after which the solution is sterilized by passage through a sintered glass filter. The thiolated gelatin solution containing penicillin is placed in a beaker and agitated violently with simultaneous addition of sterile air so that a sponge-like material is developed. The aerated thiolated gelatin now is removed and spread out on a glass surface to be sectioned. Cross-linking is allowed to take place by air oxidation, after which the pieces are used as implants. These implants occupy the space formerly taken up by excised tissue, and at the same time allow the contained antibiotic to diffuse slowly through the thiolated gelatin matrix into the surrounding tissue.

EXAMPLE 12

A solution of thiolated gelatin is prepared as described in Example 1 and adjusted to pH 9.5 after which it is cast in a thin film. Following overnight incubation in the refrigerator a cross-linked thin film is peeled off and used to wrap solid food items such as raw sliced carrots. A 0.5% sodium chloride solution is prepared, brought to boiling temperature, and the bag of carrots is immersed in the water for 10 minutes. It was found that the thiolated gelatin film remained intact and supported the carrots contained within the sac but the thiolated gelatin membrane also allowed seasoning of the food by allowing sodium chloride to diffuse through the membrane and into the food.

EXAMPLE 13

A solution of thiolated gelatin is prepared as described in Example 1 in which is dissolved zinc chloride to give a final concentration of 3%. This solution is used to coat the zinc anode in a Leclanche type dry cell battery. The purpose of this coating is to provide a protective absorbent film which adheres uniformly to the zinc surface and thereby minimizes corrosion of the zinc anode when the dry cell is on open circuit. This film permits ionic transfer when the dry cell is on closed circuit without building up internal resistance. The heat which is developed during use on open circuit is not able to melt the coating.

EXAMPLE 14

In order to effect a separation of the amino acids glutamic acid and aspartic acid, and illustrate ionic movement within an electrical field, an electrophoretic apparatus was constructed which used thiolated gelatin as the medium. A 10% solution of thiolated gelatin was prepared adjusted to pH 9.0, poured into a trough 30" x 6" x ¼" and allowed to cross-link. The resulting water-insoluble gel was washed thoroughly with deionized water and a shallow slit, 6" x ⅛", cut in the gel 10" from one end (negative electrode). The sodium salts of the two amino acids, pH 7.0, were poured into the slit and current applied by a positive electrode at the one end of the gel and a negative electrode at the other—as is done in a conventional biochemical technique. 270 volts and 150 ma. were applied for 24 hours after which a sheet of filter paper was laid over the gel surface, allowing it to become saturated. The paper was removed, dried, and sprayed with ninhydrin reagent after which it was redried for 6 minutes at 96° C. Two definite bands appeared which were eluted and subjected to ultraviolet absorption. A clear differential migration toward the anode and a separation of the two amino acids was shown, proving that cross-linked thiolated gelatin permits selective diffusion of compounds. No elaborate cooling system was required as the oxidized thiolated gelatin did not melt at the high temperatures developed during electrophoresis.

EXAMPLE 15

Thiolated gelatin is prepared as described in Example No. 1, adjusted to pH 8.5, and poured into a mold designed to cast a thin film in the shape of a sphere 3" in diameter. 10 to 20 grams of commercially dehydrated potato are deposited within the thiolated gelatin sac and the closure sealed by pressure from horizontal dies. The sac containing the dehydrated potato is now placed in a vacuum oven and dehydrated to remove moisture and permit cross-linking of the sac. The resulting package now is a single unit which can be hydrated and cooked in one operation. This is accomplished by immersing the package in boiling water. The cross-linked sac does not melt but, instead, permits passage of water to re-hydrate the potato, cook the potato, and re-hydrate the membrane to the preshaped form.

While the invention has been described in detail with reference to certain specific embodiments, various changes and modifications which fall within the spirit of the invention and scope of the appended claims will become apparent to the skilled artisan. The invention, therefore, is only intended to be limited by the appended claims or their equivalent wherein we have endeavored to claim all inherent novelty.

We claim:

1. A method for the controlled admixing of an active material selected from the group consisting of water-soluble substances and water-miscible substances with an aqueous medium which comprises:

isolating said active material with a barrier of high bloom cross-linked thiolated gelatin, said gelatin having disulfide cross links formed by the oxidative union of from 2 to 25 free thiol groups per mol of gelatin and said gelatin being selectively impermeable to said active material and permeable to said aqueous medium; and exposing said gelatin barrier to said aqueous medium whereby said medium is diffused through the molecular structure of said barrier at a controlled rate and into intimate admixture with said active material.

2. A method for the controlled release of an active material selected from the group consisting of water-soluble substances and water-miscible substances into an aqueous medium which comprises:

isolating said active material with a barrier of high bloom cross-linked thiolated gelatin, said gelatin having disulfide cross links formed by the oxidative union of from 2 to 25 free thiol groups per mol of gelatin and said gelatin being selectively impermeable to said active material in the absence of said aqueous medium and permeable to said aqueous medium; and exposing said gelatin barrier to said aqueous medium whereby said medium is diffused through the molecular structure of said barrier and into intimate admixture with said active material forming a mixture of active material and aqueous medium capable of diffusion through said barrier.

3. The method as claimed in claim 2, wherein the high bloom cross-linked thiolated gelatin forms a barrier between the active material and skin whereby the active material diffuses through the barrier onto the skin.

4. The method as claimed in claim 2, wherein the high bloom cross-link thiolated gelatin is in the form of a foam.

5. The method as claimed in claim 2 wherein the barrier is an implant.

6. The method as claimed in claim 2 wherein the barrier is a hemostatic agent.

References Cited

UNITED STATES PATENTS

| | | | |
|---|---|---|---|
| 3,028,308 | 4/1962 | Zambito et al. | 167—82 |
| 3,065,142 | 11/1962 | Antonides | 167—82 |
| 3,106,483 | 10/1963 | Kline et al. | 260—117 |
| 3,111,512 | 11/1963 | Benesch et al. | 260—117 |
| 3,171,831 | 3/1965 | Town | 260—117 |

OTHER REFERENCES

Benesch et al., Proceedings of Nat'l Acad. of Sciences, vol. 44, No. 9, September 1958, pp. 848–853.

Benesch et al., J.A.C.S., vol. 78 (1956), pp. 1597–1599.

Benesch et al., J.A.C.S., vol. 81 (1959) pp. 3802–3803.

ALBERT T. MEYERS, *Primary Examiner.*

JULIAN S. LEVITT, *Examiner.*

GEORGE A. MENTIS, *Assistant Examiner.*